(12) United States Patent
Johnson (10) Patent No.: US 12,551,823 B2
(45) Date of Patent: *Feb. 17, 2026

(54) HEAT DRIVEN OSMOSIS WATER AND POWER GENERATOR

(71) Applicant: Lonnie G. Johnson, Atlanta, GA (US)

(72) Inventor: Lonnie G. Johnson, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,699

(22) Filed: Dec. 3, 2024

(65) Prior Publication Data
US 2025/0177881 A1   Jun. 5, 2025

Related U.S. Application Data

(60) Provisional application No. 63/605,790, filed on Dec. 4, 2023.

(51) Int. Cl.
*B01D 5/00* (2006.01)
*B01D 53/14* (2006.01)
(Continued)

(52) U.S. Cl.
CPC ......... *B01D 5/0075* (2013.01); *B01D 5/0054* (2013.01); *B01D 5/006* (2013.01);
(Continued)

(58) Field of Classification Search
CPC .... B01D 5/0075; B01D 5/0054; B01D 5/006; B01D 53/263; B01D 53/1425; B01D 53/18; B01D 61/0022; B01D 2257/80; B01D 2313/243; B01D 2313/246; F03B 13/00; F03B 13/08; F05B 2260/20; F05B 2260/60; F05B 2220/706; E03B 3/28
See application file for complete search history.

(56) References Cited

U.S. PATENT DOCUMENTS

10,500,544 B2 * 12/2019 Benton ............. B01D 61/0022
11,489,185 B2    11/2022 Johnson
(Continued)

*Primary Examiner* — Dapinder Singh
(74) *Attorney, Agent, or Firm* — Baker, Donelson, Bearman, Caldwell & Berkowitz PC (57) ABSTRACT

A heat driven osmosis water and power generator consists of dilute hygroscopic solution flow loop, an air humidity exchanger, a condensation solution circulation pump, a pressure retarded osmosis exchanger, a pressure exchanger, an evaporation chamber, a recuperative heat exchanger, a concentrated solution circulation pump, a solution pressure differential turbine generator, a freshwater power turbine, a concentrated hygroscopic solution flow loop and condensed water reservoir. The pump circulates low concentration, dilute, hygroscopic solution between air humidity exchanger and osmosis exchanger. Moisture is absorbed into low concentration hygroscopic solution from air circulation through humidity exchanger. As solution circulates through osmosis exchanger, moisture is extracted through osmosis membrane by concentrated hygroscopic solution. Concentrated hygroscopic solution circulation pump circulates high concentration solution between pressure retarded osmosis exchanger and vaporization chamber. Solution flowing to and from vaporization chamber is maintained at a lower pressure than fluid circulating through osmosis exchanger.

5 Claims, 6 Drawing Sheets

(51) Int. Cl.
  *B01D 53/26*  (2006.01)
  *B01D 61/00*  (2006.01)
  *E03B 3/28*  (2006.01)
  *F03B 13/00*  (2006.01)
  *F03B 13/08*  (2006.01)

(52) U.S. Cl.
  CPC ....... *B01D 53/1425* (2013.01); *B01D 53/263* (2013.01); *B01D 61/0022* (2022.08); *E03B 3/28* (2013.01); *F03B 13/00* (2013.01); *F03B 13/08* (2013.01); *B01D 2257/80* (2013.01); *B01D 2313/243* (2013.01); *B01D 2313/246* (2013.01); *F05B 2220/706* (2013.01); *F05B 2260/20* (2013.01); *F05B 2260/60* (2013.01)

(56) References Cited

U.S. PATENT DOCUMENTS

| | | | |
|---|---|---|---|
| 2002/0172844 A1 | 11/2002 | Ito | |
| 2005/0145568 A1* | 7/2005 | Mc Ginnis | B01D 61/0022 210/639 |
| 2006/0225420 A1* | 10/2006 | Al-Mayahi | F03G 7/015 60/645 |
| 2006/0278089 A1* | 12/2006 | Theilow | B01D 53/263 96/290 |
| 2009/0297431 A1* | 12/2009 | McGinnis | B01D 3/146 203/25 |
| 2014/0319056 A1* | 10/2014 | Fuchigami | B01D 61/0022 210/648 |
| 2015/0211132 A1 | 7/2015 | MacKinnon | |
| 2023/0011620 A1 | 1/2023 | Johnson | |

\* cited by examiner

HEAT DRIVEN OSMOSIS WATER AND POWER GENERATOR

CROSS-REFERENCE TO RELATED APPLICATIONS

Applicant claims the benefit of U.S. Provisional Patent Application Ser. No. 63/605,790 filed Dec. 4, 2023 and entitled "Heat Driven Osmosis Water and Power Generator".

SUMMARY OF THE INVENTION

The present invention uses a hygroscopic solution to condense atmospheric water in combination with a heat driven distillation process to extract the water from the solution and a pressure retarded osmosis power generation. There are numerous applications where an inexpensive device that extracts water from the ambient atmosphere would be useful. Applications range from supplying power and water for farm irrigation, power and freshwater in geographically remote locations where power and freshwater is scarce, to reducing the grid load of buildings for HVAC and other applications. The heat to drive the process may be provided from a range of sources depending on the application including geothermal, solar or waste heat such as that released by industrial processes. For large scale production of drinking water in arid climates or supplying dry air to buildings, solar could be an attractive heat source. On the other hand, waste heat from cooking stoves could be used for production of water in smaller scale applications such as watering household flower plants or building dehumidification.

FIELD OF THE INVENTION

The present invention relates, in general, to an improved power generator and ambient water condenser device, system and method. More specifically, the present invention relates to improved power generation and ambient humidity condenser apparatuses, assemblies, methods, and systems having components operative in an enclosed environment wherein all components are placed in an enclosed space configured to provide potable water extracted from ambient air.

BACKGROUND OF THE INVENTION

Although the Earth's surface is approximately seventy-one percent water, over ninety-five percent of this water is found in oceans making it non-potable. The remaining approximately fifteen percent of the Earth's water exists as water vapor, in rivers, in lakes, in icecaps, in glaciers, in ground water, and in aquifers. With the Earth's population exceeding seven billion people, there is an increasing need to provide sources of fresh potable water, especially in arid climates and underdeveloped areas with limited access to water. In addition, there exist a need to transition to reduce dependence on fossil fuels for power generation and transportation.

Atmospheric humidity condensers utilizing are a known art for extracting water from the ambient atmosphere. However, many of these systems are expensive requiring bulky inefficient components operating in sizable water condensation systems. The predominant process for extracting water from ambient air is by use of electrical energy driven refrigeration cycles which consume very large amounts of energy. Other solutions include water desalination systems for harvesting water from ocean or sea salt water and fog harvesters that are used specialized membranes to collect potable water ambient air. In general, these solutions are quite cumbersome, inefficient, and expensive as well. None of them produce electricity during the condensation process.

Accordingly, there remains a need for improved, efficient, inexpensive atmospheric water extraction system that generates electrical power at the same time. This need and other needs are satisfied by the various aspects of the present disclosure.

DETAILED DESCRIPTION AND PREFERRED EMBODIMENT

Figure 1:
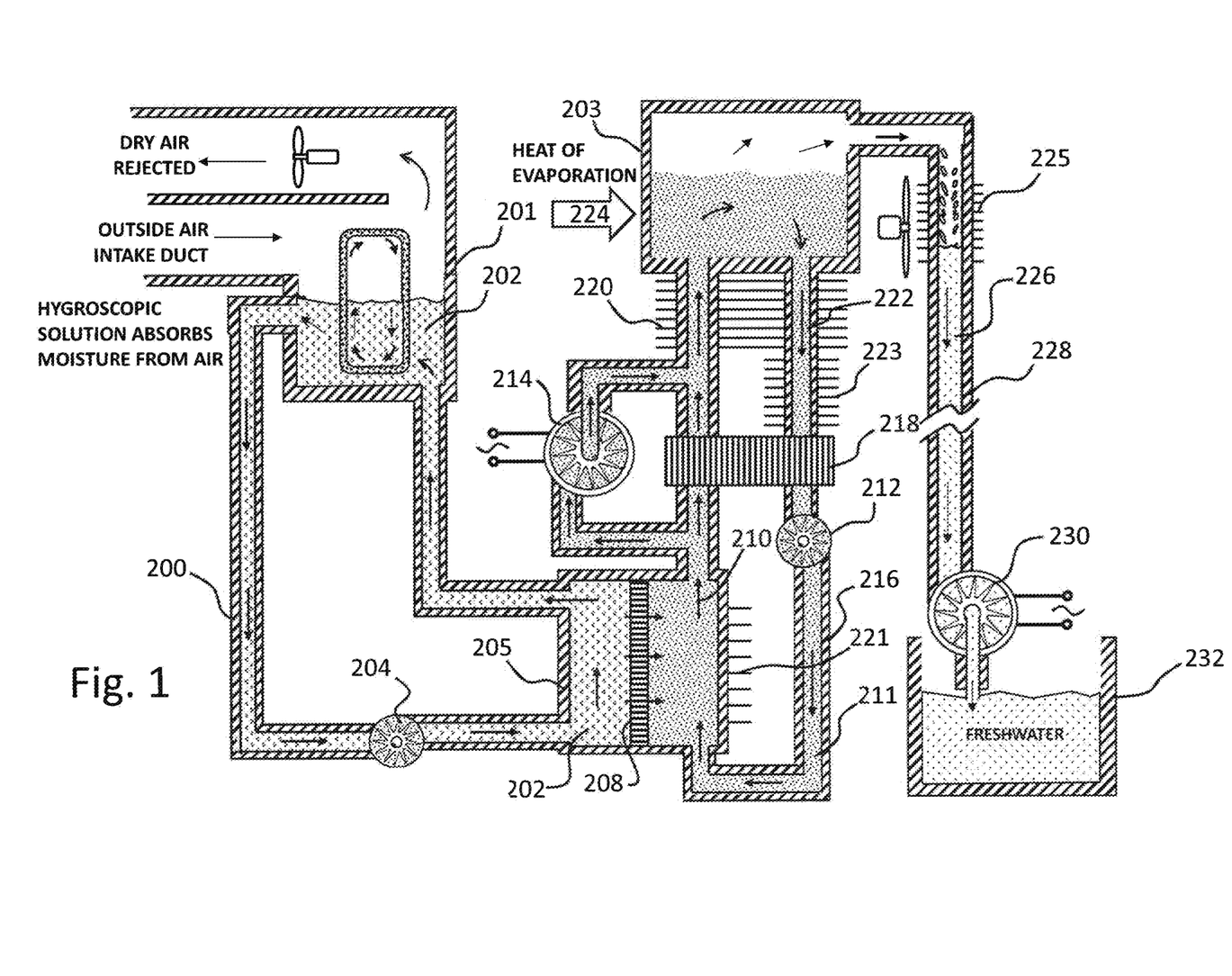
FIG. 1 is a schematic view of the heat driven osmosis water and power generator embodying principles of the invention in a preferred form.

FIG. 1 shows a heat driven osmosis water and power generator or atmospheric water vapor extraction power generation device 10 that is representative of the present invention and referenced hereinafter simply as device 10. The basic device 10 consists of dilute hygroscopic solution flow loop 200, air humidity exchanger 201, condensation solution circulation pump 204, pressure retarded osmosis exchanger 205, pressure exchanger 218, evaporation chamber 203, recuperative heat exchanger 220, concentrated solution circulation pump 212, solution pressure differential turbine generator 214, freshwater power turbine 230, concentrated hygroscopic solution flow loop 216 and condensed water reservoir 232.

Pump 204 circulates low concentration, dilute, hygroscopic solution 202 between air humidity exchanger 201 and osmosis exchanger 205. Moisture is absorbed into low concentration hygroscopic solution 202 from air circulation through humidity exchanger 201. On the other hand, as solution 202 circulates through osmosis exchanger 205, moisture is extracted through osmosis membrane 208 by concentrated hygroscopic solution 210. Concentrated hygroscopic solution circulation pump 212 circulates high concentration solution 211 between pressure retarded osmosis exchanger 205 and vaporization chamber 203. Solution flowing to and from vaporization chamber 203 is maintained at a lower pressure than fluid circulating through osmosis exchanger 205. Heat exchanger 221 extracts heat of absorption from solution 210 within osmosis chamber 205 as the solution absorbs moisture. Pressure exchanger 218 and turbine 214 are driven by the pressure difference. Pump 212 compensates for efficiency losses associated with pressure exchanger 218 to maintain a stable pressure differential.

Solution 210 leaving osmosis exchanger 205 passes through pressure exchanger 218 and bypass generator 214 and on into evaporation chamber 203. Heat 224 is coupled to evaporation chamber 203 to evaporate water out of solution passing through chamber 203. The resulting steam is condensed by heat rejection to ambient with the resulting condensed water being supplied through conduit 228 to freshwater power turbine 230 and then on into reservoir 232. With evaporation of water therefrom, solution leaves chamber 203 more concentrated. It passes through pressure exchanger 208 and on to pump 212.

Electrical power and water are continuously produced as water is condensed from air passing through chamber 201 into solution 202 and extracted from solution 202 as it circulates through exchanger 205. Pressurized concentrated solution 210 passing through exchanger 205 increases in volume as it extracts water from solution 202 through osmosis membrane 208. The increased volume leaving exchanger 205 passes through pressure exchanger 218 and turbine generator 214. The volume of fluid flowing through pressure exchanger 218 is equivalent to the volume leaving vaporization chamber 203 and thereby has sufficient energy to substantially repressurize the fluid leaving the vaporization chamber. The excess volume of solution resulting from water absorption through membrane 208 from solution 202 is supplied to turbine 214 to generate electricity from the pressure difference between fluid 210 in chamber 205 and the lower pressure solution in chamber 203. Water condensed at the top of conduit 228 is supplied to water turbine 230 under gravitational pressure head. The efficiency of such a system is not limited to Carnot because the water within the column is extracted from the atmosphere at height and therefore does not have to be considered in the efficiency calculation. The solar driven ambient air circulation does the work in carrying the water to the top of the converter. The efficiency relative to Carnot is determined from the amount of heat input and its temperature relative to the amount of electrical power generated by turbine 214. Turbine 230 1s not within the basic thermodynamic cycle.

Figure 2:
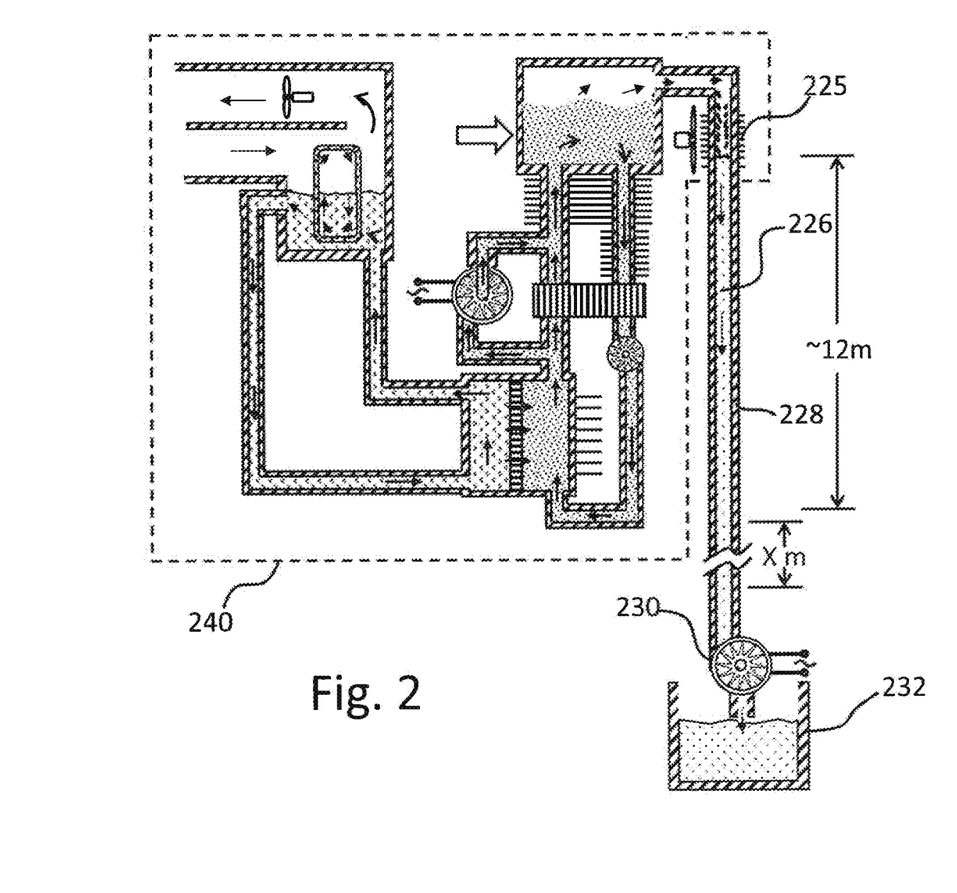
FIG. 2 is a schematic view of the heat driven osmosis water and power generator embodying principles of the invention in a preferred form.

FIG. 2 shows a representative embodiment of the invention wherein the main sections 240 of the invention are mounted at some height such as at the top of a tower or on a tall building. The freshwater reservoir is mounted a distance "X" meters below section 240.

Fresh water condensed at the top of conduit 228 is supplied to water turbine 230 under gravitational pressure head. The efficiency of such a system is not limited to Carnot because the water within the column is extracted from the atmosphere at height and therefore does not have to be considered in the efficiency calculation. The solar driven ambient air circulation does the work in carrying the water to the top of the converter. The efficiency relative to Carnot is determined from the amount of heat input and its temperature relative to the amount of electrical power generated by turbine 214. Turbine 230 is not within the basic thermodynamic cycle.

Figure 3:
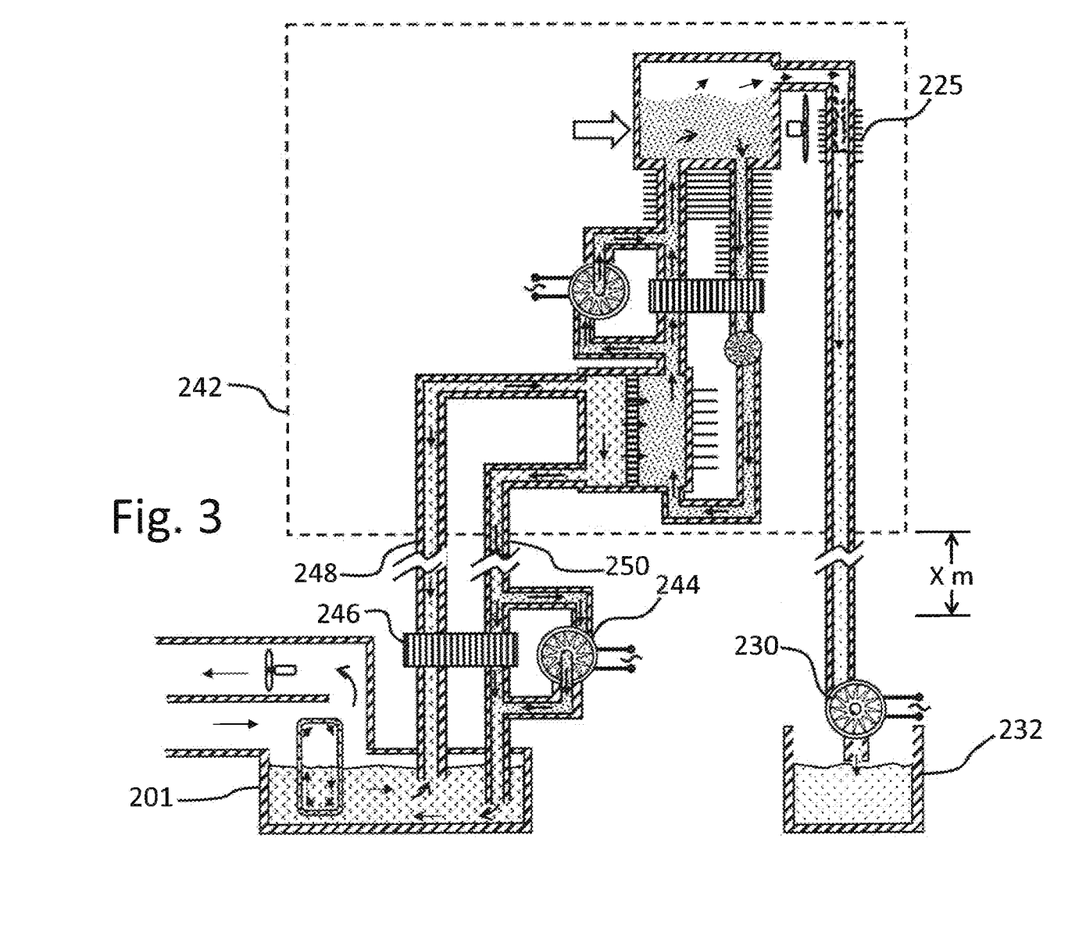
FIG. 3 is a schematic view of the heat driven osmosis water and power generator embodying principles of the invention in a preferred form.

FIG. 3 shows a representative embodiment of the invention wherein sections 242 of the invention are mounted at some height such as at the top of a tower or on a tall building. The freshwater reservoir is mounted a distance, "X" meters, below section 242. Similarly, air humidity exchanger 201, pressure exchanger 246 and low concentration solution electrical generator turbine 244 are shown in FIG. 3 mounted a distance, "X" meters, below section 242. As illustrated by the drawing, moisture depleted solution in conduit 250 flows down through pressure exchanger 246 and turbine generator 244 into humidity exchanger 201 where it absorbs ambient moisture. The resulting low concentration hygroscopic solution flows up conduit 248 thought pressure exchanger 246 and then into osmosis exchanger 205 where the absorbed moisture is extracted. The flow is motivated within the conduits by the gravitational pressure head differential between the two columns due to the difference in density between the moisture latent solution in conduit 248 versus the moisture depleted solution in conduit 250. A portion of the pressure differential powers pressure exchanger 246 to pump lower density water rich solution up conduit 248. Pressure exchanger 246 prevents the weight of the solution within conduits 248 and 250 from evacuating solution from the evaporation chamber 203 at the top. The remaining portion of the flow under the difference in pressure head powers turbine 244 to generate electricity.

Figure 4:
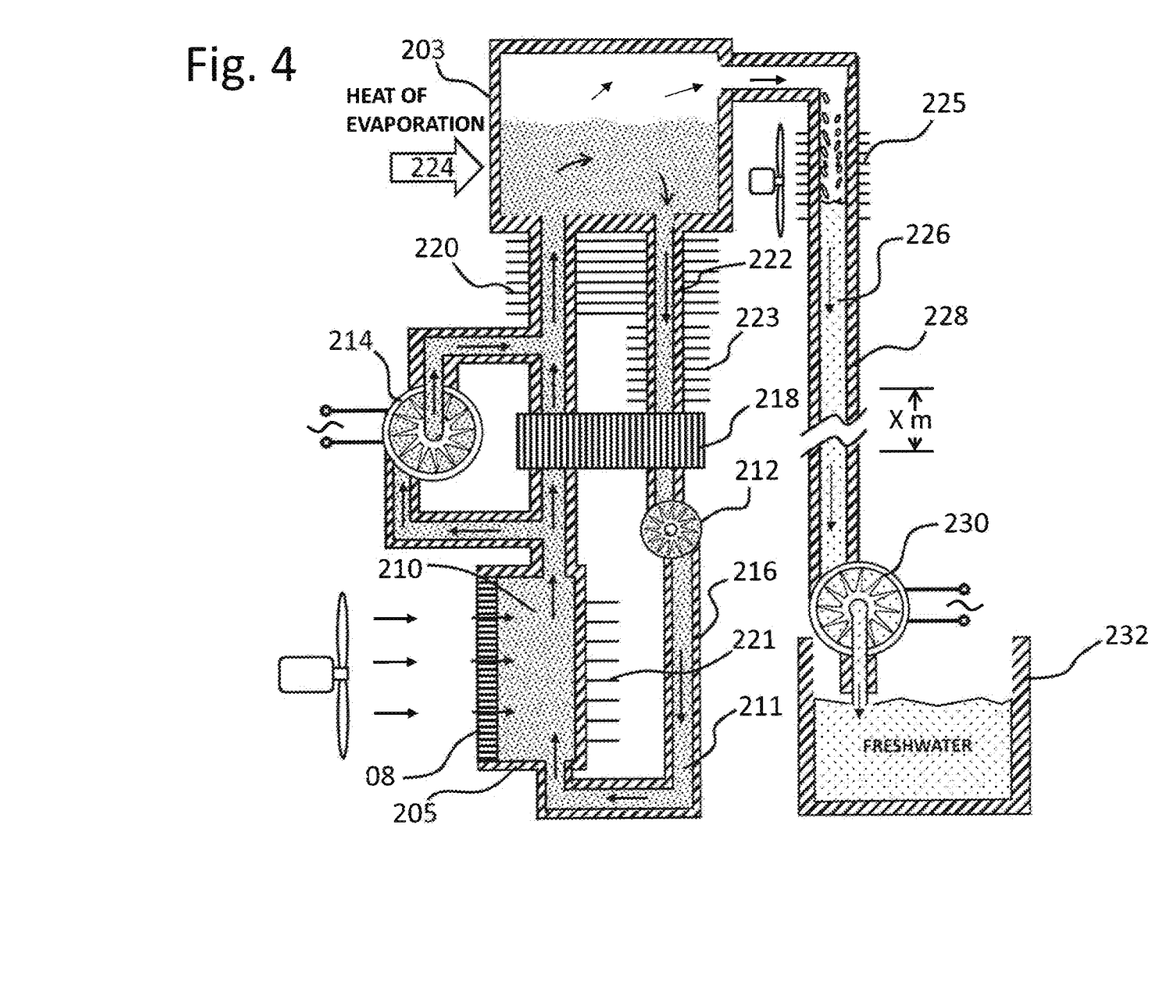
FIG. 4 is a schematic view of the heat driven osmosis water and power generator embodying principles of the invention in a preferred form.

FIG. 4 shows elimination of the low concentration solution loop and the humidity exchange chamber eliminated. Ambient moisture is absorbed directly into the high concentration solution 210 through osmosis membrane 208. In this case membrane 208 is preferably hydrophobic to provide improved resistance to permeation of dissolved salt or other hygroscopic enabling solvents. The remaining components function as previously described, see FIG. 1. Heat exchanger 221 rejects heat of absorption from osmosis chamber 205 as solution therein absorbs moisture.

Figure 5:
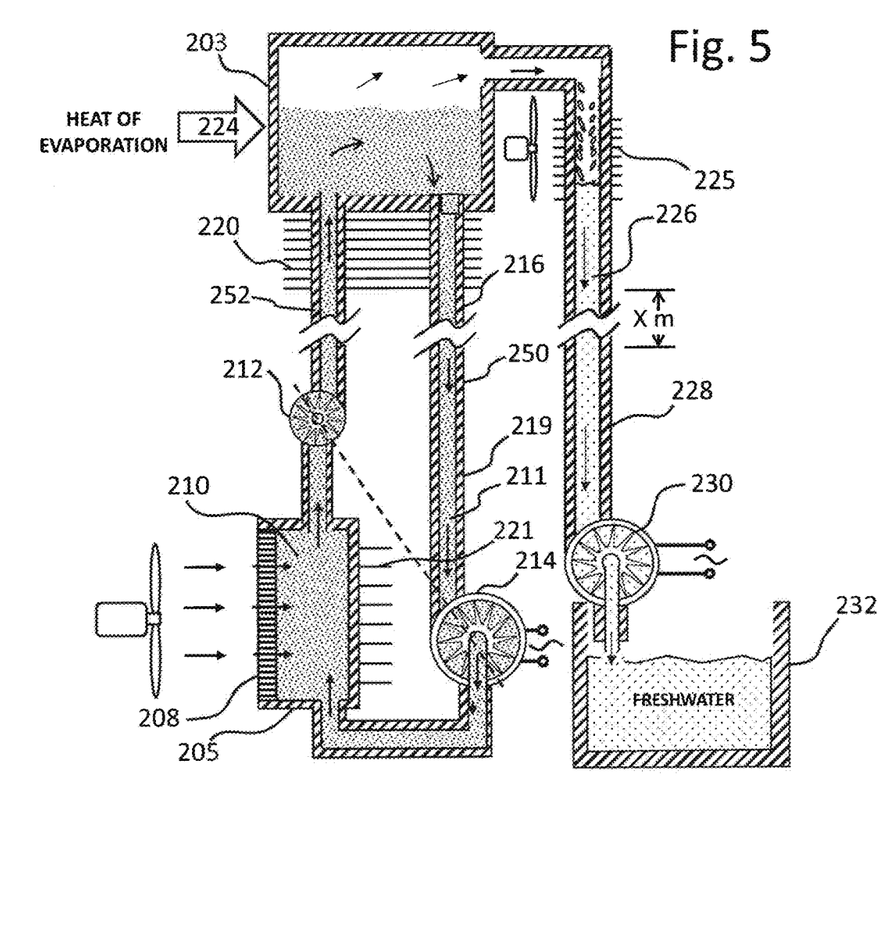
FIG. 5 is a schematic view of the heat driven osmosis water and power generator embodying principles of the invention in a preferred form.

FIG. 5 shows the ambient interfacing membrane 208 and osmosis exchanger 205 positioned some distance, "X" meters, below condensation chamber 203. In this configuration, fluid circulation under the difference in gravitational pressure head of the highly concentrated solution within conduit 250 relative to the gravitational pressure head of the lower density solution within conduit 252 powers turbine generator 214. Energy is coupled to pump 212 as necessary to pump lower density water rich solution leaving osmosis chamber 205 up conduit 252 to evaporation chamber 203. Turbine generator 214 and pump 212 together function as a pressure exchanger whereby hygroscopic solution circulates continuously between absorption osmosis chamber 205 and evaporation chamber 203 while maintaining a low pressure within osmosis chamber 205 to prevent retardation of absorption under the gravitational pressure head of the solution within conduits 250 and 252.

Figure 6:
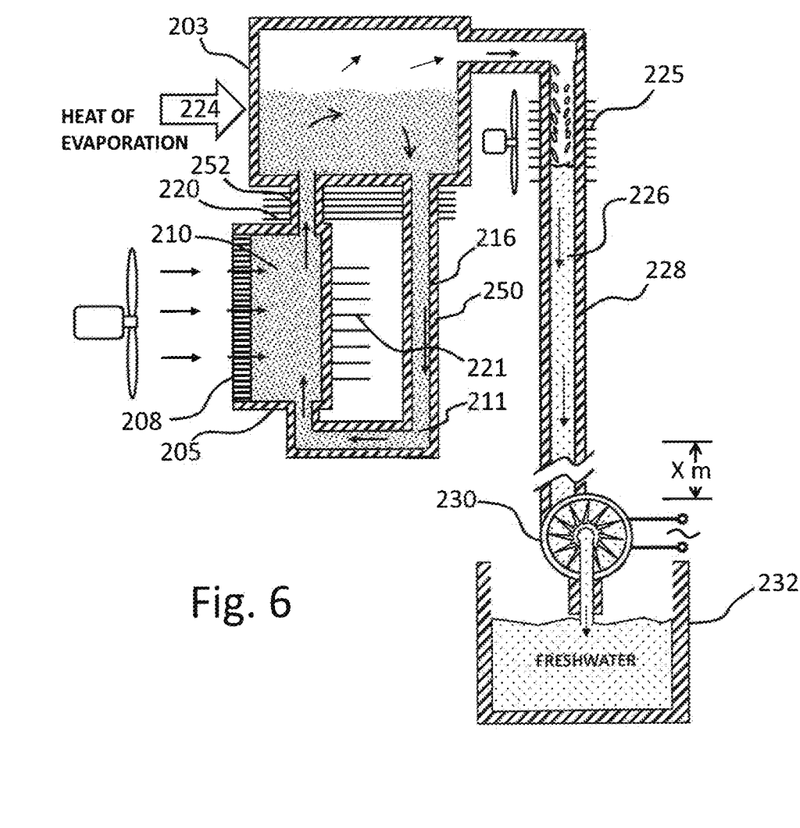
FIG. 6 is a schematic view of the heat driven osmosis water and power generator embodying principles of the invention in a preferred form.

FIG. 6 shows the ambient interfacing membrane 208 moisture exchange chamber 205 positioned some distance below condensation chamber 203. In this configuration, fluid circulation under the difference in gravitational pressure head of the highly concentrated solution within conduit 250 relative to the gravitational pressure head of the dilute, lower density solution leaving moisture exchange chamber 205. Low concentration hygroscopic solution absorbs ambient moisture as it flows through humidity exchanger 201 and then rises through conduit 248 to osmosis exchanger 205. The moisture latent solution passes through osmosis exchanger 205 where absorbed moisture is extracted. The resulting moisture depleted solution flows down through conduit 250. The flow is motivated within the conduits by the gravitational pressure head differential between the two columns due to the difference in density between the moisture latent solution in conduit 248 versus the moisture depleted solution in conduit 250.

I claim:

1. A water and power generator comprising:
a dilute condensation hygroscopic solution;
a concentrated hygroscopic solution;
an osmosis exchanger;
an air humidity exchanger;
a pressure exchange turbine generator;

an evaporation chamber, and a concentrated solution circulation pump, wherein the dilute condensation hygroscopic solution circulating between the air humidity exchanger and the osmosis exchanger whereby it extracts moisture from ambient air and supplies the moisture to the osmosis exchanger, the concentrated hygroscopic solution circulating between the osmosis exchanger and the evaporation chamber whereby it absorbs solution by osmosis in the osmosis exchanger and releases it in the evaporation chamber, wherein the concentrated solution pump receiving water depleted hygroscopic solution leaving the evaporation chamber and supplying it through the osmosis exchanger to the pressure exchange turbine at high pressure, wherein the concentrated hygroscopic solution having a higher absorption affinity for moisture absorbs water from the diluted concentration hygroscopic solution by osmosis as it passes through the osmosis exchanger and thereby brings the absorbed water to the high pressure of the concentrated solution as supplied by the concentrated solution circulation pump, and wherein at substantially the same pressure, the increased volume of solution flow to turbine generator relative to that supplied by the concentrated solution circulation pump results in a greater amount of power being generated by the pressure exchange turbine generator than that consumed by the concentrated solution circulation pump resulting in net output power.

2. The water and power generator as disclosed in claim 1 further including a pressure exchanger, the pressure exchanger being fluidly coupled between the osmosis exchanger and the evaporation chamber in parallel with the pressure exchange turbine generator and in series with the concentrated solution circulation pump whereby the volume flowing through the pressure exchange turbine generator is substantially equivalent to the volume of water absorbed by the concentrated hydroscopic solution within the osmosis exchanger, and the volume flowing through the pressure exchanger is substantially equivalent to that pumped by concentrated solution circulation pump, the pressure exchanger recovering the pressure energy of hygroscopic solution leaving the osmosis exchanger passing therethrough from high pressure to low pressure and supplying the pressure energy to the diluted condensation hygroscopic solution passing therethrough from the evaporation chamber to supply it at high pressure to the concentrated solution circulation pump.

3. The water and power generator as disclosed in claim 1 further includes a freshwater turbine and wherein the evaporation chamber includes a heat sink for removing heat to condense the water vapor generated therein, the resulting condensed water being supplied under pressure to the freshwater turbine whereby the freshwater turbine generates electrical power.

4. The water and power generator as disclosed in claim 1 further includes a water collection reservoir, water condensed in the evaporation chamber being supplied to the water collection reservoir.

5. A water and power generator comprising:

an evaporation chamber;

a humidity exchanger;

a freshwater column having vertical height with a top end and bottom end;

a freshwater electrical generator;

a humidity exchange chamber, and a hygroscopic solution, wherein the evaporation chamber, the humidity exchange chamber, the freshwater column and the freshwater electrical generator are fluidically coupled together, the hygroscopic solution being contained within the evaporation chamber and humidity exchange chamber and circulating between the evaporation chamber and the humidity exchange chamber, the humidity exchange chamber exposing the hygroscopic solution to ambient air to facilitate attraction and condensation of ambient humidity into the hygroscopic solution to form a water hydroscopic solution, the resulting water latent hygroscopic solution carrying the absorbed water to the evaporation chamber where heat is supplied to evaporate water therefrom, the evaporated water flowing to the top end of the water column where heat is removed to condense the water, the fresh water electrical generator being connected to the bottom of the freshwater column, the condensed water flowing under the pressure resulting from the weight of the water column through the electrical generator to produce electricity.

* * * * *